United States Patent [19]

Kiss et al.

[11] Patent Number: 4,874,433

[45] Date of Patent: Oct. 17, 1989

[54] METHODS OF PREPARING ENCAPSULATED PIGMENTS

[75] Inventors: Akos Kiss, Alzenau-Wasserlos; Peter Kleinschmit, Hanau; Juergen Hanich, Frankfurt; Guenter Halbritter, Rodenbach; Jenny Horst, Gelnhausen, all of Fed. Rep. of Germany

[73] Assignee: Degussa Aktiengesellschaft, Frankfurt am Main, Fed. Rep. of Germany

[21] Appl. No.: 201,947

[22] Filed: Jun. 3, 1988

[30] Foreign Application Priority Data

Jun. 6, 1987 [DE] Fed. Rep. of Germany ....... 3719051

[51] Int. Cl.$^4$ ................................................ C08K 3/00
[52] U.S. Cl. .................................... 106/450; 106/481; 106/487
[58] Field of Search .................... 106/450, 481, 487; 428/402.24

[56] References Cited

U.S. PATENT DOCUMENTS

| | | | |
|---|---|---|---|
| 3,802,900 | 4/1974 | Broll | 106/288 |
| 3,822,181 | 7/1974 | Vassiliades et al. | 428/402.24 |
| 3,826,670 | 7/1974 | Rees | 428/402.24 |
| 3,847,639 | 11/1974 | Broll | 106/288 |
| 3,869,298 | 3/1975 | Suzuki et al. | 106/450 |
| 3,919,110 | 11/1975 | Vassiliades et al. | 428/402.24 |
| 4,520,376 | 5/1985 | Morishita et al. | 428/402.24 |
| 4,766,051 | 8/1988 | Breton et al. | 428/402.24 |

FOREIGN PATENT DOCUMENTS 2312535  4/1964  Fed. Rep. of Germany.

*Primary Examiner*—Paul Lieberman
*Assistant Examiner*—Willie J. Thompson
*Attorney, Agent, or Firm*—Beveridge, DeGrandi & Weilacher

[57] ABSTRACT

Encapsulation pigments comprising chromophoric particles embedded in glaze-stable casings are prepared by means of calcination from the appropriate initial products. High yields and strong color intensities are obtained if the chromophoric substance or its initial compounds are bound in and/or to a zeolite and are calcined in this form with the remaining constituents.

5 Claims, No Drawings

METHODS OF PREPARING ENCAPSULATED PIGMENTS

BACKGROUND AND INTRODUCTION

The present invention relates to a method of preparing encapsulated pigments comprising a chromophoric [color-bearing] substance which is encapsulated in a transparent casing formed of a substance stable against chemical attacks and vitrification by means of compounding the chromophoric substance or its initial components with the encapsulating substance or its initial components and by a subsequent calcination at 500 to 1200° C, optionally in the presence of a mineralizer.

Encapsulated pigments are coloring bodies in which discrete, inorganic color particles are embedded on all sides in mostly crystalline, transparent encasing substances, whereby the encasing substances are stable against vitrification and other chemical attacks. In principle, all known chromophoric, temperature-stable substances can be encapsulated, in particular cadmium sulfoselenides or sulfides, or sulfides, selenides and sulfoselenides of mercury and zinc, as well as gold purple, iron oxide and other colored metal oxides and metal oxide mixtures. Any suitable mixtures can also be used as is known in the art. In particular, zirconium silicate, zirconium oxide, silicon oxide, tin oxide, aluminum oxide, various spinels, zinc silicate, zirconium phosphate and aluminum phosphate have proven to be stable encasing substances. These encasing substances resist the attack of glass flows, oxygen at high temperatures and chemical substances such as e.g. acids.

DE-OS 23 12 535 describes a method of preparing such inclusion pigments in which a mixture of the chromophoric substance or compounds from which the colored substance is formed and of the encasing substance or compounds from which the encapsulating substance forms during annealing is annealed at 800° C to 1200° C, optionally in the presence of a mineralizer such as e.g. lithium fluoride, magnesium fluoride and similar substances. These pigments are heated and cooked with acids in order to remove still-adhering, acid-soluble substances. It is also known that the chromophoric component and the encapsulating substance or its initial compounds can be precipitated from an aqueous solution in common or in series and subsequently calcined (e.g. EP 0,074,779; DE-OS 33 45 413).

All previously known methods do not yield optimum coloring bodies as regards their color intensity; low yields of inclusion pigments and too-high a portion of relatively large particles are obtained.

SUMMARY OF THE INVENTION

It is an object of the present invention to provide a method for encapsulating one or more pigments of the type previously described in such a manner that coloring bodies are obtained in yields with great color intensity and small particle size.

In accordance with the above and other objects, a feature of the invention resides in encapsulated pigments comprising chromophoric particles embedded in glaze-stable casings prepared by means of calcination from the appropriate initial products. High yields and great color intensities are obtained if the chromophoric substance or its initial compounds are bound into and/or onto a zeolite and are calcined in this form with the remaining constituents.

Thus, in carrying out the invention, there is provided a method of preparing encapsulated pigments comprising a chromophoric or color-bearing substance which is encapsulated in a transparent casing composed of a substance stable against chemical attack and glass stream or vitrification by means of compounding the chromophoric substance or its initial components with the encapsulating substance or its initial components and by a subsequent calcination at 500 to 1200° C. Optionally, the process is carried out in the presence of a mineralizer. It is a feature of the invention that the chromophoric substance or one or more initial components of the chromophoric substance is bound in and/or to a zeolite. Preferably, a zeolite is used wherein the $SiO_2/Al_2O_3$ proportion of the zeolite is between 1 and 10. Typically, the average zeolite particle size is between 1 and 20$\mu$m.

In a further aspect of the invention, zirconium oxide and silicon oxide are used for the formation of zirconium silicate as the encapsulating substance. Other inorganic substances that form a transparent coating can be used.

The zirconium oxide particles and silicon oxide particles used in accordance with this aspect of the invention are smaller than the zeolite particles.

It is essential for the invention that the chromophoric substance not be added as such or in the form of its initial compounds directly to the mixture with the encapsulating substance or its initial compounds. Instead, the chromophoric substance or one or more of its initial components are bound into a zeolite and/or to a zeolite.

Encapsulation pigments of strong color intensity in a high yield are surprisingly obtained by using zeolites with incorporated chromophores, the particle size of which can be controlled by the particle size of the zeolite used.

Zeolites are water containing alkali and alkaline earth aluminum silicates with different $SiO_2/Al_2O_3$ ratios which act as ion exchangers and are provided with certain pore opening sizes. They can be synthetically prepared with desired properties in accordance with known procedures. The initial compounds of the chromophoric components of known encapsulation pigments can be readily incorporated into these zeolites whereby the incorporation can take place via ion exchange or on the inner surfaces of the pores.

It is preferable to use zeolites with a $SiO_2/Al_2O_3$ ratio between 1 and 10 and particle sizes between 1 and 20$\mu$m. Defined, selectable pigment particle sizes are obtained by forming the encapsulating stable against chemical attacks directly on the surface of the individual zeolite particles. The zeolite can function at the same time thereby as a $SiO_2$ source or an $Al_2O_3$ source for the encapsulation substance.

Zirconium silicate has proved to be very good as an encapsulation substance whereby zirconium oxide and a part of the stoichiometrically necessary silicon oxide are added to the mixture while the rest of the $SiO_2$ is furnished by the zeolite. It is also advantageous thereby if the zirconium oxide particles or their initial compounds are smaller than the zeolite particles.

The following are possible examples of encapsulation substances which can also be used: Zirconium oxide, silicon oxide, tin oxide, spinels, zinc silicate, zirconium phosphate or aluminum phosphate. The sulfides, selenides, sulfoselenides and tellurides of cadmium, mercury and zinc have special significance as chromophoric component.

DETAILED DESCRIPTION OF INVENTION

The following examples are intended to illustrate the invention in more detail:

Example 1. 100g Na-zeolite A with an average particle size of 5μm are added into a solution of 77g CoSO$_4$/7H$_2$O in 275g water. The suspension is heated under agitation to a boil. After it has cooled off, it is filtered and washed sulfate-free. The rose-colored product is dried in a drying cupboard at 130° C whereby the color turns blue.

20 g of this blue Co-zeolite A are intensively mixed in a dry ball mill together with 50.5 g ZrO$_2$, 24.5 g SiO$_2$ and 5 g MgF$_2$ and subsequently calcined at 1100° C for 30 min. The blue pigment is ground to the desired fineness and exhibits an excellent color intensity.

Example 2. A hot solution of 155 g FeSO$_4$/7H$_2$O in 1000 ml water is compounded with 200g Na-zeolite A according to example 1. The mixture is heated to a boil, filtered and washed sulfate-free. After drying, a yellowish brown Fe-zeolite of the type ZK 4 is obtained.

The zirconium oxide hydrate is precipitated from a solution of 81 g ZrOCl$_2$/8H$_2$O in 300 ml water by the addition of NH4OH. The matter is compounded under agitation with 63 g Fe-zeolite, filtered and washed with water. After drying at 130° C, the fine powder is calcined 30 min. at 1000° C.

A red pigment is obtained which can be used for coloring glazes.

Example 3. An Na-Cd exchange is performed in accordance with example 1 using 100 ml water with 54 g Cd (NO$_3$)$_2$/4H$_2$O and 50 g Na-zeolite A. 17g of the washed and dried Cd-zeolite is mixed in a beater mill with 53 g ZrO$_2$ 20 g SiO$_2$, 3.0 g LiF, 4.8 g Na$_2$SO$_3$, 1.2 g Se, 1.0 g K$_2$CO$_3$ and 1.8 g sugar. After the addition of 10% water, the mixture is calcined 15 min. at 1050° C. Free Cd$^{2+}$ and Se are removed by a following wash with HCl/H$_2$O$_2$. An orange-colored, glaze-stable pigment with high color intensity is obtained.

The inclusion rates in the above examples were between 30 and 80%, the average particles sizes between 3 and 20 μm.

Further variations and modifications of the foregoing will be apparent to those skilled in the art and are intended to be encompassed by the appended claims.

German priority application P 37 19 051.2-41 is relied on and incorporated by reference.

We claim:

1. A method of preparing encapsulated pigments comprising a chromophoric or color-bearing substance which is encapsulated in a transparent casing compound of a substance stable against chemical attacks and glass stream vitrification, said method comprising binding the chromophoric substance or its initial components in and/or to a zeolite, followed by mixing with the encapsulating substance or its initial components and subsequently calcining at 500° C.

2. The method according to claim 1, wherein the zeolite has a SiO$_2$/Al$_2$O$_3$ ratio of from 1 and 10.

3. The method according to claim 1, wherein the average zeolite particle size is between 1 and 20μm.

4. The method according to claim 1, wherein zirconium oxide and silicon oxide are used to form zirconium silicate as the encapsulating substance.

5. The method according to claim 4, wherein in that the zirconium oxide particles and silicon oxide particles used are smaller than the zeolite particles.

* * * * *